United States Patent
Matus, Jr.

(10) Patent No.: US 7,784,398 B2
(45) Date of Patent: Aug. 31, 2010

(54) FOOD PROTECTOR APPARATUS THAT ATTACHES TO A DROP-IN FOOD PAN AND METHOD

(75) Inventor: Jose Orlando Matus, Jr., Gainesville, GA (US)

(73) Assignee: Elemental Ideas, LLC, Gainesville, GA (US)

( * ) Notice: Subject to any disclaimer, the term of this patent is extended or adjusted under 35 U.S.C. 154(b) by 1045 days.

(21) Appl. No.: 11/405,318

(22) Filed: Apr. 17, 2006

(65) Prior Publication Data

US 2006/0230948 A1  Oct. 19, 2006

Related U.S. Application Data

(60) Provisional application No. 60/672,734, filed on Apr. 19, 2005.

(51) Int. Cl.
*A47J 37/00* (2006.01)
*B65D 51/16* (2006.01)
*B65D 1/40* (2006.01)

(52) U.S. Cl. ............ 99/645; 99/646 C; 99/341; 220/573.1; 220/369; 220/731

(58) Field of Classification Search ............ 99/645, 99/646 C, 341; 220/369, 731, 573.1, 912; 126/299 C; 312/1, 284, 229
See application file for complete search history.

(56) References Cited

U.S. PATENT DOCUMENTS

| | | | | |
|---|---|---|---|---|
| 1,682,095 A | * | 8/1928 | Reyther | 220/731 |
| 2,350,243 A | * | 5/1944 | Mackay | 220/848 |
| 2,486,966 A | | 11/1949 | Mitchell | |
| 2,496,121 A | * | 1/1950 | De Ment et al. | 220/731 |
| 2,517,467 A | | 8/1950 | Culver | |
| 2,836,187 A | * | 5/1958 | Dunnagan | 135/96 |
| 3,357,765 A | * | 12/1967 | Molitor | 312/284 |
| 3,404,930 A | | 6/1968 | Cafiero et al. | |
| 3,738,606 A | | 6/1973 | Millen | |
| 3,921,539 A | | 11/1975 | Berger | |
| 4,013,880 A | | 3/1977 | Kennedy, Jr. et al. | |
| 4,403,711 A | * | 9/1983 | Kyosuke | 220/731 |
| 4,572,598 A | | 2/1986 | Moore, Jr. | |
| 5,082,334 A | | 1/1992 | Beyer et al. | |
| 5,213,401 A | | 5/1993 | Hatcher | |
| 5,306,077 A | | 4/1994 | Trevaskis | |

(Continued)

FOREIGN PATENT DOCUMENTS

DE  3907597 A1  4/1990

OTHER PUBLICATIONS

Advertisement Brochure—Z Guard, Brass Smith Incorporated, 1999, pp. 1-4.

*Primary Examiner*—Reginald L Alexander
(74) *Attorney, Agent, or Firm*—Daniel J. Santos

(57) ABSTRACT

The food protector apparatus of the invention attaches directly to the food pan such that the food protector shield is at the proper location with respect to the food pan. Because the food protector apparatus is attached to the food pan, proper installation of the food pan ensures that all of the corresponding standards and health code requirements are met. Thus, it is virtually impossible for the food protector to be installed in a countertop in a way that fails to meet those standards and requirements.

16 Claims, 2 Drawing Sheets

U.S. PATENT DOCUMENTS

| | | | |
|---|---|---|---|
| 5,584,545 A | 12/1996 | LaVaute et al. | |
| 5,699,784 A * | 12/1997 | Tippmann et al. | 126/33 |
| 5,823,102 A | 10/1998 | Will | |
| 5,967,022 A * | 10/1999 | Moschella | 99/339 |
| 6,101,954 A | 8/2000 | Rein et al. | |
| 6,132,018 A | 10/2000 | McGrath | |
| 6,485,118 B2 | 11/2002 | Matus, Jr. | |
| 6,588,863 B1 | 7/2003 | DeWitt et al. | |
| 7,040,723 B2 | 5/2006 | Matus, Jr. | |

* cited by examiner

FOOD PROTECTOR APPARATUS THAT ATTACHES TO A DROP-IN FOOD PAN AND METHOD

CROSS-REFERENCE TO RELATED APPLICATIONS

This application claims priority to provisional patent application No. 60/672,734, filed on Apr. 19, 2005, entitled "FOOD PROTECTOR APPARATUS THAT ATTACHES TO A DROP-IN FOOD PAN", which is hereby incorporated by reference herein.

TECHNICAL FIELD OF THE INVENTION

The invention relates to a food protector apparatus and method. More particularly, the invention relates to a food protector apparatus that comprises one or more support members that attach on one end to a drop-in food pan and on another end to a clear shield (e.g., tempered glass, laminated safety glass, clear acrylic, plastic, etc.).

BACKGROUND OF THE INVENTION

All sneeze guards, food guards, breath shields, counter protectors or food protectors currently mount directly to a countertop surface. The countertop surface has a receptacle formed therein for receiving one or more drop-in food pans below the food protector shield. The countertops may be made of, for example, laminated wood, stainless steel, a solid surface material, granite, marble, soapstone, a butcher block, substrate materials, etc.

A variety of techniques are used to mount the food protector to the countertop surface. Most of these techniques require the drilling or cutting of the countertop surface to configure the surface to accept the framework or supporting members of the food protector. Other techniques require physical attachment of a surface plate directly to the countertop or substrate material with threaded fastening devices.

Food protectors are required by all local, regional and state health authorities and are generally designed and manufactured to meet Food And Drug Administration (FDA) National Sanitation Foundation (NSF) Standard 2 guidelines. NSF is widely recognized as the leading independent certification company worldwide. NSF evaluates and certifies products that may potentially affect public health. Most manufacturers of food protection equipment carry the NSF mark for food guards. The FDA and NSF guidelines for a food protector over open or exposed food in a public establishment require that a food shield (tempered glass, laminated safety glass or clear acrylic) be positioned so as to intercept the breath from the average consumer.

The NSF mandated positioning of the food shield is directly related to the location of the food, not the counter height or depth from which the food is served. For example, currently the positioning requirement of NSF Standard 2 is that the leading edge of a food shield (glass or clear acrylic) must project no less than 7 inches from the front edge (customer side) of the food on display. This standard also requires that the maximum height that the leading edge of a food shield can be from the top of the food displayed is 14 inches. These standards do not, however, have a direct association with counter height or depth. The standards specifically govern the relationship between the location of the food shield and the location of the food, i.e., the location of the food pan.

One of the most common problems associated with food protectors is that the installer may or may not position the food protector in a location around the food area in compliance with the current FDA and NSF Standard 2 requirements or local or state health codes. In many cases, food protectors are installed by parties with little or no knowledge of the various local or state health codes or of the FDA and NSF Standard 2 guidelines. It is not unusual for food protectors to be installed in such a way that they fail health inspection due to improper location of the food protectors on the counter. When this occurs, the food protector must be removed and relocated, often leaving unsightly holes in the countertop surface that must be patched. In some cases, the entire countertop must be replaced.

Accordingly, a need exists for a food protector apparatus that is incapable of being installed in such a way that FDA and NSF Standard 2 guidelines, and any other applicable health codes, are not met.

SUMMARY OF THE INVENTION

The invention provides a method and apparatus for protecting food contained in a food pan. The food protection apparatus is secured directly to the food pan. The food protection apparatus comprises at least one support member and a shield. The support member is attached on a first portion of the support member to the shield and on a second portion of the support member to the pan. This ensures that the food protector shield is at the proper location with respect to the food pan.

These and other features and advantages of the invention will become apparent from the following description, drawings and claims.

DETAILED DESCRIPTION OF AN EXEMPLARY EMBODIMENT

The present invention eliminates the aforementioned problems associated with the known food protector techniques and devices by attaching the food protector apparatus directly to the food pan. This ensures that the food protector shield is at the proper location with respect to the food pan. Because the food protector apparatus is attached to the food pan, proper installation of the food pan ensures that all of the corresponding standards and health code requirements are met. Thus, it is virtually impossible for the food protector to be installed in a countertop in a way that fails to meet those standards and requirements.

The food protector apparatus of the invention typically will be designed and manufactured by the manufacturer of the pan as an integral part of the pan. This ensures that an equipment installer (regardless of his or her knowledge of FDA and NSF Standard 2 or applicable health codes) will position the food protector apparatus in the proper position by simply installing the food pan in the receptacle formed in the countertop. Once the food pan has been installed, the food protector shield attached to the food pan will be positioned at the proper clearances relative to the food. As described in more detail below, the pan may be a drop-in pan or a built-in pan of various types.

Figure 1:
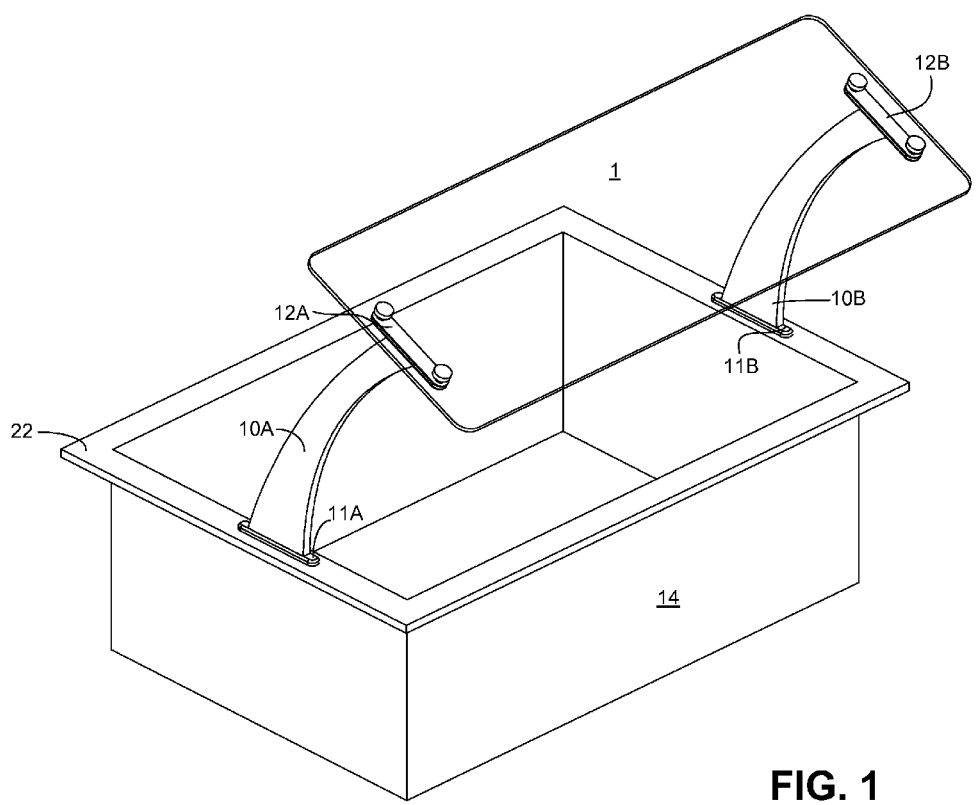
FIG. 1 illustrates a perspective view of the food protector apparatus of the invention in accordance with an exemplary embodiment attached to a food pan.

FIG. 1 illustrates a perspective view of a drop-in pan having a food protector apparatus attached thereto in accordance with an exemplary embodiment of the invention. The food protector apparatus includes a clear shield 1, which is typically tempered glass, but may be made of other materials (e.g., glass, clear acrylic, plastic or otherwise), and support members 10A and 10B, which have bases 11A and 11B that attach to the flange or lip 22 of the drop-in pan 14. Each support member 10A and 10B has an upper support 12A and 12B that attaches to the shield 1.

The bases 11A and 11B may be attached by screws, bolts, rivets, solder, welding, adhesive, etc. The bases 11A and 11B may be fixedly or removably attached to the pan 14. Various mounting methods and devices may be used for this purpose to accommodate the manufacturing standards of the various equipment manufacturers. Drop-in pans are often manufactured such that the lip or flange 22 sits above the countertop surface (not shown) when the pan is dropped into the corresponding receptacle in the countertop. The food protector apparatus of the invention preferably attaches directly to the flange 22 of the respective drop-in equipment. However, the invention is not limited with respect to the manner in which the food protector apparatus attaches to the pan 14.

The invention also is not limited with respect to the number of support members used to support the shield. For example, although two support members 10A and 10B are shown in the exemplary embodiment represented by FIG. 1, a single support member or more than two support members may be used to couple the shield to the pan. However, the design of the pan may require that a particular type of support structure and/or attachment mechanism be used.

Figure 2:
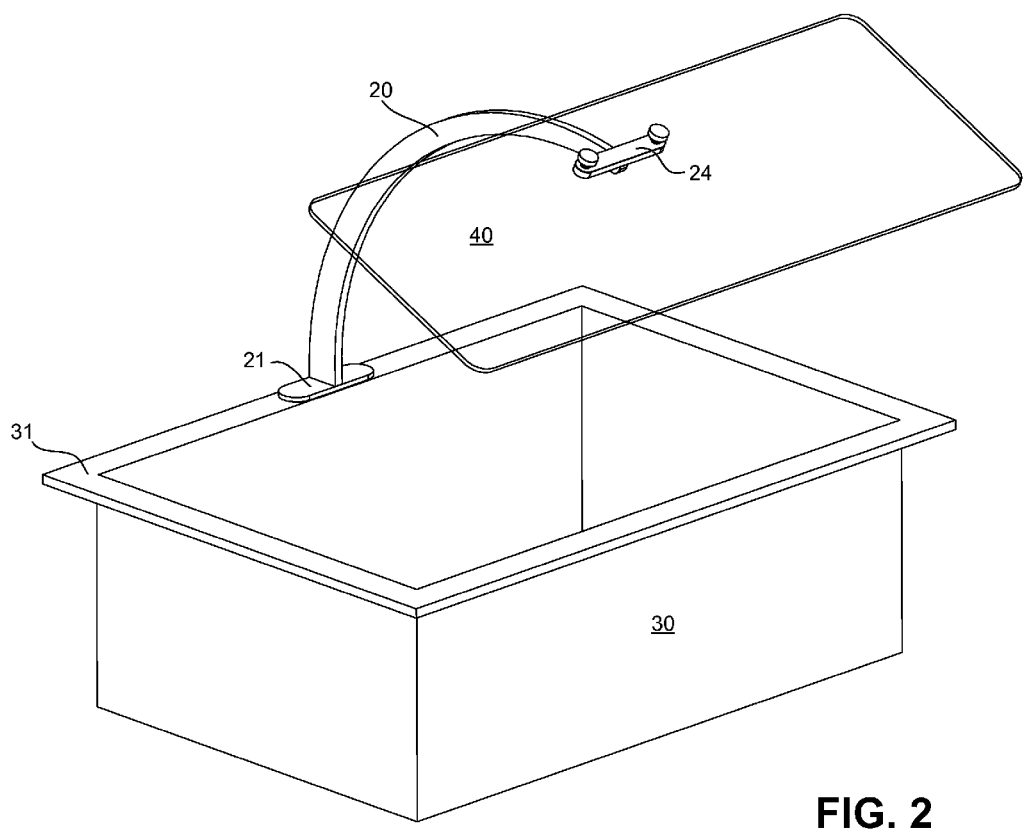
FIG. 2 illustrates a perspective view of the food protector apparatus of the invention in accordance with another exemplary embodiment attached to a food pan.

FIG. 2 illustrates a perspective view of a drop-in pan having a food protector apparatus attached thereto in accordance with another exemplary embodiment of the invention. In accordance with this embodiment, the food protector apparatus has a single support member 20, which has a base 21 that attaches to the flange 31 of a drop-in food pan 30. The support member 20 has an end 24 that attaches to the shield 40 of the food protector apparatus. The base 21 may be attached by any attachment mechanism including, for example, screws, bolts, rivets, solder, welding, adhesive, etc. The base 21 may be removably or fixedly attached to the pan.

Another advantage of the invention is that it eliminates problems associated with removing and relocating previously installed food protector apparatuses due to improper placement on the counter. Because it is impossible or at least extremely difficult to improperly install the food protector apparatus of the invention, due to it being attached to the food pan, removing and relocating a food protector apparatus typically will not be an issue.

Yet another advantage of the invention is that it obviates the need for the end user or customer to order separate products (i.e., the food pans and the food protector apparatuses) that require separate installations and that may have varying lead times or turnaround times. The end user or customer simply purchases and installs a drop-in heated or cold pan with the food protector apparatus of the invention already mounted to the framework. This further eliminates the possibility that the food protector apparatus will not be in conformance with applicable health codes and FDA and/or NSF Standard 2 guidelines.

In addition, the food protector apparatus of the invention eliminates the added cost associated with installing a stand-alone food protector as well as any guesswork involved in locating the food protector apparatus on the counter. The combination of these aspects of the invention result in a cost savings for all parties involved from the manufacturer of the drop-in food pan to the end user. Currently, there are several manufacturers of built-in or drop-in non-refrigerated cold pans, built-in or drop-in heated food pans, built-in or drop-in refrigerated cold pans, built-in or drop-in warmers, built-in or drop-in baine marie warmers and built-in or drop-in frost tops and steam tables. These manufacturers include Atlas Metal Industries, Wells, Delfield, Randell, Kairak, Eagle Group, Duke Manufacturing, Low Temp Industries, Carbone Metal Fabricators, and Vollrath. The food protector apparatus of the invention may be attached, or integrally manufactured as part of, any of these and other types of drop-in or built-in devices.

It should be noted that the invention has been described with reference to a few particular exemplary embodiments and that the invention is not limited to these embodiments. For example, although FIG. 2 depicts the support member attached to the flange at a particular location, the support member may be attached at any location on the pan using any attachment configuration. Many variations may be made to the embodiment described herein, and all such variations are within the scope of the invention.

What is claimed is:

1. A pan having a food protection apparatus attached thereto, the food protection apparatus comprising:
   at least first and second support members, each support member having a first portion and a second portion, each support member comprising a beam structure with a tapering cross-sectional area; and
   a shield comprising a substantially planar shape, the first support member being attached on the first portion of the first support member to the shield, the first support member being attached on the second portion of the first support member to the pan, the second support member being attached on the first portion of the second support member to the shield, the second support member being attached on the second portion of the second support member to the pan, wherein the first and second support members operate to position the shield with respect to the pan, the support members fixedly spacing the shield a set distance from the pan such that the shield does not move relative to the pan and such that the shield does not contact the pan.

2. The pan of claim 1, wherein the pan has a flange around a periphery of the pan, and wherein the second portion of each support member attaches to the flange of the pan on opposite sides of the pan.

3. The pan of claim 1, wherein the pan is a built in non-refrigerated cold pan.

4. The pan of claim 1, wherein the pan is a drop-in non-refrigerated cold pan.

5. The pan of claim 1, wherein the pan is a built-in heated food pan.

6. The pan of claim 1, wherein the pan is a drop-in heated food pan.

7. The pan of claim 1, wherein the pan is a built-in refrigerated cold pan.

8. The pan of claim 1, wherein the pan is a drop-in refrigerated cold pan.

9. The pan of claim 1, wherein the pan is a built-in warmer.

10. The pan of claim 1, wherein the pan is a drop-in warmer.

11. The pan of claim 1, wherein the pan is a built-in frost top.

12. The pan of claim 1, wherein the pan is a drop-in frost top.

13. The pan of claim 1, wherein the pan is a built-in steam table.

14. The pan of claim 1, wherein the pan is a drop-in steam table.

15. A method of protecting food comprising:

securing a food protector apparatus to a pan, the food protector apparatus comprising a shield and at least first and second support members, wherein the shield has a substantially planar shape, the first support member having a first portion that attaches to the shield and a second portion that attaches to the pan, the second support member having a first portion that attaches to the shield and a second portion that attaches to the pan, the first and second support members having beam structures having a tapering cross-sectional areas, wherein when the food protector apparatus is attached to the pan, the shield is at a predetermined and fixed position with respect to the pan such that the shield does not move relative to the pan and such that the shield does not contact the pan.

16. The method of claim 15, wherein the pan has a flange around a periphery of the pan, and wherein the second portion of each support member attaches to the flange of the pan on opposite sides of the pan.

* * * * *